(12) United States Patent
Coxall et al.

(10) Patent No.: US 10,289,882 B2
(45) Date of Patent: May 14, 2019

(54) CARGO HANDLING SYSTEM

(71) Applicant: Amadeus S.A.S., Biot (FR)

(72) Inventors: Matthew Coxall, Berkshire (GB);
Maria Krasko, Antibes (FR)

(73) Assignee: AMADEUS S.A.S., Biot (FR)

( * ) Notice: Subject to any disclaimer, the term of this patent is extended or adjusted under 35 U.S.C. 154(b) by 84 days.

(21) Appl. No.: 15/190,434

(22) Filed: Jun. 23, 2016

(65) Prior Publication Data
US 2017/0372105 A1    Dec. 28, 2017

(51) Int. Cl.
*G06K 7/10*    (2006.01)
*G06Q 10/08*    (2012.01)

(52) U.S. Cl.
CPC ....... *G06K 7/10386* (2013.01); *G06Q 10/087* (2013.01)

(58) Field of Classification Search
USPC ........................................................ 235/385
See application file for complete search history.

(56) References Cited

U.S. PATENT DOCUMENTS

| 6,842,121 B1* | 1/2005 | Tuttle | G06K 7/0008 340/10.51 |
| 2015/0195804 A1* | 7/2015 | Stewart | H04W 4/029 455/433 |

OTHER PUBLICATIONS

Maria Krasko et al., U.S. Appl. No. 14/789,080, filed Jul. 1, 2015 entitled "Baggage Tracking System".
Pierre-Philippe Di Costanzo et al., U.S. Appl. No. 14/727,150, filed Jun. 1, 2015 entitled "Airplane-To-Ground Communication".

* cited by examiner

*Primary Examiner* — Michael G Lee
*Assistant Examiner* — David Tardif
(74) *Attorney, Agent, or Firm* — Thompson Hine LLP

(57) ABSTRACT

Systems and methods for managing information flow when handling cargo. A mobile reader may be configured to connect to wirelessly readable memory devices provided on aircraft cargo containers. The memory device stores onward handling information for individual pieces of cargo stored in the container. The mobile reader may be further configured to display the onward handling information.

21 Claims, 11 Drawing Sheets

CARGO HANDLING SYSTEM

TECHNICAL FIELD

The present invention relates to cargo handling and, more particularly, to systems and methods for managing information flow when handling cargo.

BACKGROUND

Lost or misdirected cargo in general, and luggage in particular, is a considerable impediment for the aviation industry and gives rise to undesirable costs in terms of reputational damage, as well as fiscal costs associated with returning the cargo to the intended owner. One problem that can cause improper routing of cargo is an aircraft delay on a first leg of a passenger's journey causing connecting flights to be missed or the passenger to change his or her travel plans. Cargo may not be routed in such situations in a manner conforming with the consequences of such changes and/or delays. Cargo handling can be improved by reducing the number of misplaced cargo items.

Moreover, standard handling of cargo is a time-consuming process if the individual cargo items that need to be identified are located inside of a closed container. Identifying such items may include partially or completely unloading a container suspected to hold the item, or a number of containers if it is not known which container on an arriving aircraft holds the cargo item in question, and then individually comparing IDs associated with the cargo items with the known ID of the cargo item to be located. Because these IDs are often in the form of numerical sequences, such comparisons are difficult and, if done reliably, are also time consuming.

What is needed are improved systems and methods for managing information flow when handling cargo.

SUMMARY

Embodiments of the invention relate to a system that includes a mobile reader that may be configured to connect to wirelessly readable memory devices provided on aircraft cargo containers. The memory device may store onward handling information for individual pieces of cargo stored in the container. The mobile reader is further configured to display the onward handling information. The mobile reader may be configured to use Bluetooth to connect to the wirelessly readable memory device.

At least part or all of the cargo in the cargo containers may be luggage. The mobile reader may be configured to display updated onward handling information. The updated onward handling information may be created by consolidating the onward handling information with up-to-date passenger destination information. The mobile reader may further be configured to receive the up-to-date passenger destination information from a passenger control information system at the airport and to consolidate the information within the mobile reader. The system may be further configured to receive an update on passenger destination information from an aircraft in flight. The mobile reader may be configured to connect to a passenger control information system using WiFi.

The reader may be configured to read passenger destination information associated with an item of luggage in a container from the wirelessly readable memory device of the container, to compare read passenger destination information with acquired up-to-date passenger destination information and, when a discrepancy is found by the comparison, to change onward handling information for the piece of luggage.

A plurality of readers at an airport may be configured to wirelessly detect the presence of the memory device and to update information indicating a most recent location of the container in a database following the wireless detection.

A plurality of readers at an airport may be configured to wirelessly detect the presence of the memory device, to read data stored in the memory device and to update information indicating a most recent location of items of cargo detailed in the data in a database upon reading.

According to another embodiment, a cargo handling system includes a baggage loading area in an airport, an in input device for inputting information of pieces of cargo loaded into a container, and a writing device configured to wirelessly connect to a memory device located at the container and to transmit the information to the memory device for storage. The cargo handling system is configured to check whether or not, prior to closing a flight of an aircraft, memory devices on all containers loaded onto the aircraft have stored information.

According to another embodiment, a method includes wirelessly connecting with a mobile reader to readable memory devices provided on aircraft cargo containers. The memory device stores onward handling information for individual pieces of cargo located inside the container. The method further includes displaying the onward handling information on a display of the reader and directing the individual pieces of cargo onwards according to the onward handling information.

According to another embodiment, a method of operating a reading device in a cargo handling system includes causing the reading device to establish a data connection with a wirelessly readable memory devices provided on aircraft cargo container. The memory device stores onward handling information for individual pieces of cargo stored in the container. The method further includes receiving, at the reading device from the memory device, the onward handling information and displaying received onward handling information on the reading device.

According to another embodiment, a cargo handling method includes, in a baggage loading area, inputting information of pieces of cargo loaded into a container into a cargo tracking system, and wirelessly connecting to a memory device located at the container and transmitting the information to the memory device for storage. The method further includes checking whether or not, prior to closing a flight of an aircraft, memory devices on all containers loaded onto the aircraft have stored information.

According to another embodiment, a data carrier comprises computer executable instructions that, when executed by one or more processors, cause the one or more processors to execute the any of the methods disclosed herein.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
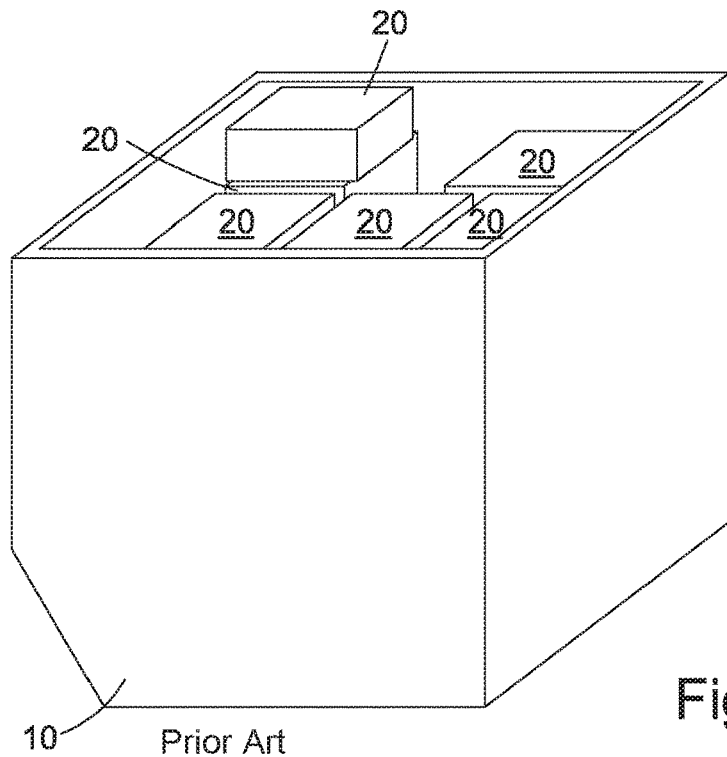
FIG. 1 shows a known container used for carrying cargo in aircraft.

FIG. 1 shows a container 10 for carrying cargo in an aircraft (e.g., a plane). The cargo may be luggage 20 of passengers also travelling on the aircraft carrying the container 10, mail, or any type of freight cargo carried on planes. Any plane carries a large number of containers of the type shown in FIG. 1. Whilst it is known which types of cargo and which individual items are carried by a plane, the available information is normally not sufficiently specific to support efforts to locate specific cargo in particular containers without a large scale search. Moreover, some type of cargo, has to meet specific stowage requirements. Some hazardous substances, for example, while being permitted to be transported as cargo on planes, have to be stowed a predetermined distance away from any human on the plane. In practice, this can mean that cargo of this type is often stored at the very bottom of containers, making it difficult to find any such items quickly.

Whilst in many situations the manner in which cargo unloaded from a plane is to be processed is known when a plane takes off at its departure airport, the bulk of all luggage, for example, may simply be destined to be collected by passengers at luggage return at the destination airport, while freight cargo or mail may be destined for a local processing center at the destination airport, it is not uncommon for destinations of luggage or other cargo to change. This is not least so in cases where the original destination of luggage/cargo was another connecting flight but where this destination changes and in situations where the passenger changes the desired destination voluntarily. It can, for example, occur that the original flight carrying the luggage/cargo is delayed so that the luggage or cargo cannot be transported to the connecting flight or that the flight delay is such that a passenger's travel plans change.

Three different scenarios can be envisaged. A passenger may, for example, decide that the delay is such that he or she is still able to get onto the connecting flight before it departs and that rushing to the connecting flight is preferable to changing travel plans. It is desirable in this scenario for the passenger's luggage to be transported on the quickest possible route to the connecting flight. The above described problems with locating the passenger's luggage quickly, however, may impede expedient transport, so that the passenger's luggage does not reach the connecting flight in time for the flight's take off. In this case, the piece(s) of luggage needs to be transported to the passenger's destination in a separate flight.

In a second scenario, the passenger may decide to wait for a later connecting flight. In this case, his or her luggage needs to be separated from other pieces of luggage that may still to be transported to the original connecting flight and re-routed to the newly chosen connecting flight. Should this not happen reliably, it may occur that the luggage is transported on the original connecting flight and may then not be available at luggage reclaim at the passenger's final destination once the customer has caught up with the luggage, simply because it has been put aside after not having been reclaimed after the initial connecting flight had landed.

In a third scenario, the passenger may decide to take a connecting flight on the next day and needs his or her luggage to be delivered to luggage reclaim for use in the originally unscheduled overnight stay, instead of to the originally intended connecting flight. It is possible for luggage to be lost or mishandled in this context.

In all three scenarios, the change to the original travel/connection arrangements can lead to mishandling and/or misdelivery of the luggage. Reconciliation processes for re-uniting the passenger with his or her luggage are exceptionally costly to the aviation industry, both in terms of handling costs as well as reputational damage.

It will be appreciated that routing luggage in a manner that can accommodate changes in transport patterns, such as, for example, those described above, can be important for luggage or, more generally, any type of cargo, to be expediently locatable.

Figure 2:
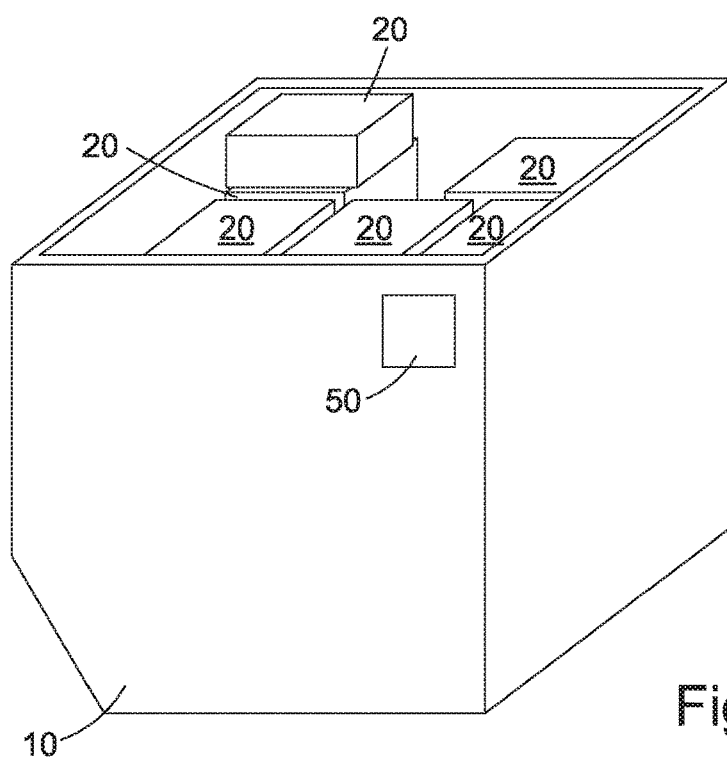
FIG. 2 shows the container of FIG. 1 with a wirelessly readable storage device in accordance with an embodiment of the invention.
Figure 3:
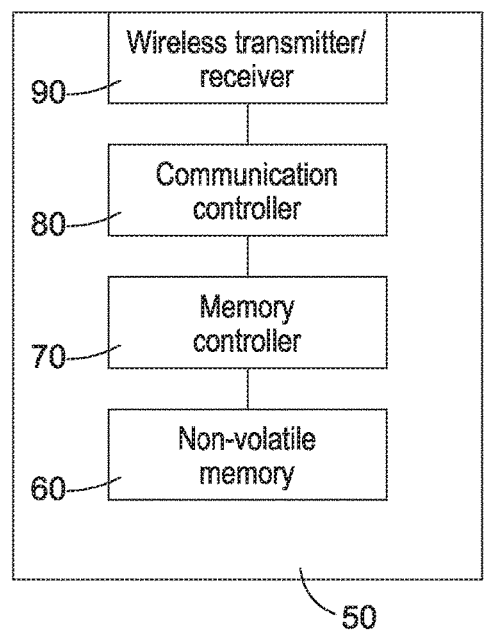
FIG. 3 shows an architecture of a wireless tag in an embodiment.

With reference to FIGS. 2 and 3 in which like reference numerals refer to like features in FIG. 1, the container 10 may be modified so that it also includes a wirelessly readable storage device 50, also referred to herein as a wireless tag. The architecture of the wireless tag 50 may include a non-volatile memory 60, a memory controller 70, a communication controller 80, and a wireless transmit and receive interface 90. The tag 50 may also include an energy storage device (not shown), as well as a display (not shown) for displaying the tag's unique ID and/or handling information, such as information on whether or not the container 10 comprises items of a specified class or items that need to be handled expediently, as valid at the last update of the information stored in the tag, on the face of the tag 50. In one embodiment, the display may be an LCD display. In an embodiment, the energy storage device is re-chargeable, preferably wirelessly so.

The non-volatile memory may be FLASH non-volatile memory. In one embodiment, the communications controller interacts with the transmitter/receiver unit 90 to allow wireless transmission with a further wireless communication device. Any wireless communication means/tags may be used. Examples of such are E-tags and NFC tags. The tag 50 can communicate with other wireless communication devices using one of the WiFi/802.11 protocols, Zigbee, or Bluetooth protocols.

The function of memory controller 70 may be integrally provided within the non-volatile memory, as is the case in some commercially available non-volatile memory products. Alternatively, the memory controller 70 and the communications controller 80 may be implemented in a single physical controller. Although a transmit and receive interface 90 is shown in embodiment of FIG. 3, the wireless tag 50 may include separate transmitter and receiver architectures in an alternative embodiment.

Figure 4:
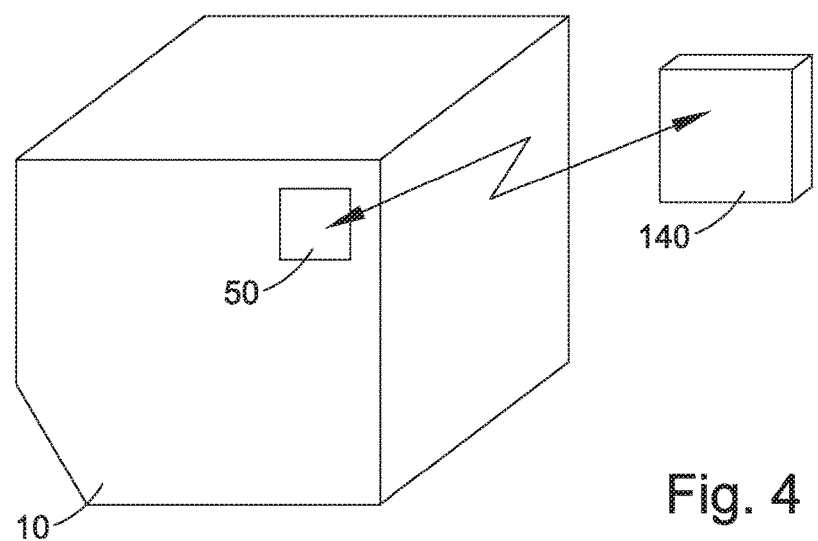
FIG. 4 shows an interaction between a hand-held device and a wireless tag in an embodiment.

The wireless tag 50 stores information relating to a current content of the container 10. The manner in which the wireless tag 50 is accessed for reading and/or writing is shown in FIG. 4, which illustrates a system comprising a container 10 that includes a tag 50 and a wireless device 140. The wireless device 140 is configured to be able to wirelessly communicate with the tag 50 using a communication protocol supported by the tag 50. The hand held device 140 may be used, for example, when loading the container 10 prior to a flight or after the flight has landed. In the former case, the hand held device 140 is used to transmit information relating to the content loaded into the container 10 to the tag 50 for storage in the non-volatile memory 60. In the latter case, the hand held device 140 may be used to request transmission of data relating to the content loaded into the container 10 from the tag 50 and to receive, either following such a request or automatically following establishment of a data connection suitable for data exchange between the tag 50 and the handheld device 140. When loading the container 10 prior to the departure of an aircraft that is to carry the container, information relating to the content loaded into the container 10 may be either accumulated in the hand held device 140 or, following accumulation in a luggage/cargo control system of the departure airport, transmitted to the hand held device 140 for onward transmission to the tag 50. In an alternative embodiment, information may be transmitted to the tag 50 directly by the luggage/cargo control system accumulating the information relating to the content of the container without using a hand held device as an intermediary. This can, in particular, be done by providing transmitters capable of and configured to communicate wirelessly with tags 50 at choke points of the luggage/cargo control system, for example at exit doors of a building in which the containers are loaded, to establish a data connection with the tag 50 when the container 10 carrying the tag 50 passes the transmitter, say on its way to the aircraft for loading. As the container passes, the luggage/cargo control system may, using the transmitter at the choke point, establish a data connection with the tag 50, request and subsequently receive from the tag 50 a unique ID stored on the tag 50 uniquely identifying the container 10 and to transmit to the container 10 a list of content loaded on the identified container 10 on the basis of data accumulated in this respect in the luggage/cargo control system when loading the container 10.

The use of hand held device 140, instead of the use of fixedly installed transmitters, may be advantageous because it does not require hardware modifications to the luggage/cargo control system. In an embodiment, the transmission of data between the hand held device 140 and the tag 50 may be based on a unique ID being stored on the tag 50 for ease of data reconciliation, the use of a hand held device also allows a visual comparison of a unique container number that may be visible on the container 10 with a unique container number displayed on a screen of the hand held device 140. The use of a hand held device thus provides a means of visually verifying that the data that is transmitted to a tag 50 relates to the container at which the tag 50 is provided.

Figure 5:
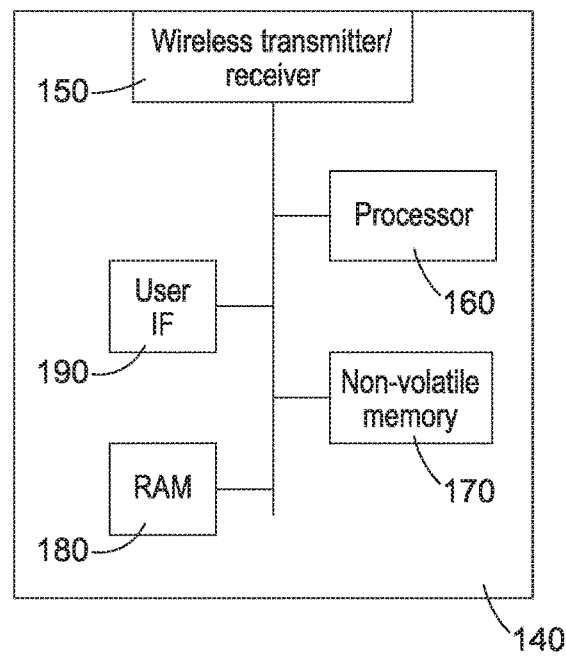
FIG. 5 shows the architecture of a hand held device useable for reading from and/or writing to the wireless tag in an embodiment.

FIG. 5 shows the architecture of a hand held device 140 in one embodiment. The hand held device 140 comprises a wireless transmit/receive unit 150 (in an alternative embodiment though separate transmit and receive units may be provided as part of the hand held device 140), a processor 160, non-volatile memory 170, random access memory 180, and a user interface 190. The hand held device 140 may be a mobile telephone or a tablet or other portable computer, or another type of mobile computing unit that find use in the operation of airport functions.

Figure 6:
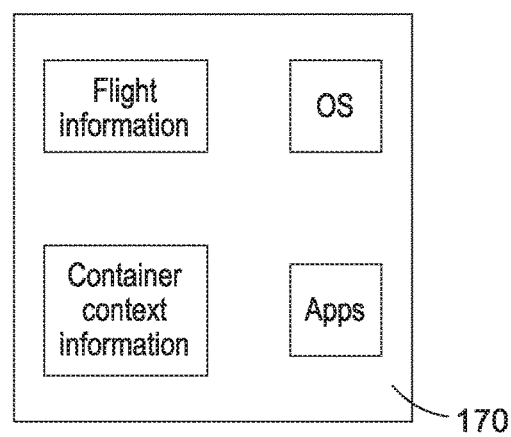
FIG. 6 shows data elements that may be stored in non-volatile memory of a hand held device of an embodiment.

FIG. 6 shows details of some of the content of the non-volatile memory 170 of the hand held device 140. The non-volatile memory, amongst other data items, stores the operating system (OS) required for operating the hand held device 140, as well as application programs for communicating with its environment, including with the tag 50 and other wireless networks within which the hand-held device may be used. These application programs include drivers for the various components of the hand held device, such as drivers for the transmit and receive interface as well as applications implementing the user interface 190 on the hand held device 140. The user interface 190 may, for example, be a graphical user interface displayed on a display screen of the hand held device to allow the user to access information relating to the handling of a particular container or of a group of containers relating to a particular flight or to a number of flights. The graphical user interface may, additionally, comprise an in input means, for example a touch screen, to allow users to input information. Alternatively or additionally, a standard keyboard, a computer mouse or other point and click device may be provided as part of or with the hand held device 140. Further alternatively or additionally, the hand held device 140 may provide voice activation and voice control in combination or separately from graphically displayed or audibly provided information.

The non-volatile memory 170 may further comprise or reserve a memory region for receiving information relating to a number of flights scheduled to arrive at the airport at which the hand held device 140 is used, information relating to the content of a container 10 that is currently being loaded, for which loading has recently finished or that has recently arrived on an in-bound flight at the airport at which the hand-held device 140 is being used.

The hand held device 140 may moreover be configured to use a plurality of wireless communication protocols to communicate with its surroundings. These protocols include the above mentioned protocols used by the wireless tag 50 but also other wireless protocols that enable communication with the environment in which the hand held device 140 operates.

Figure 7:
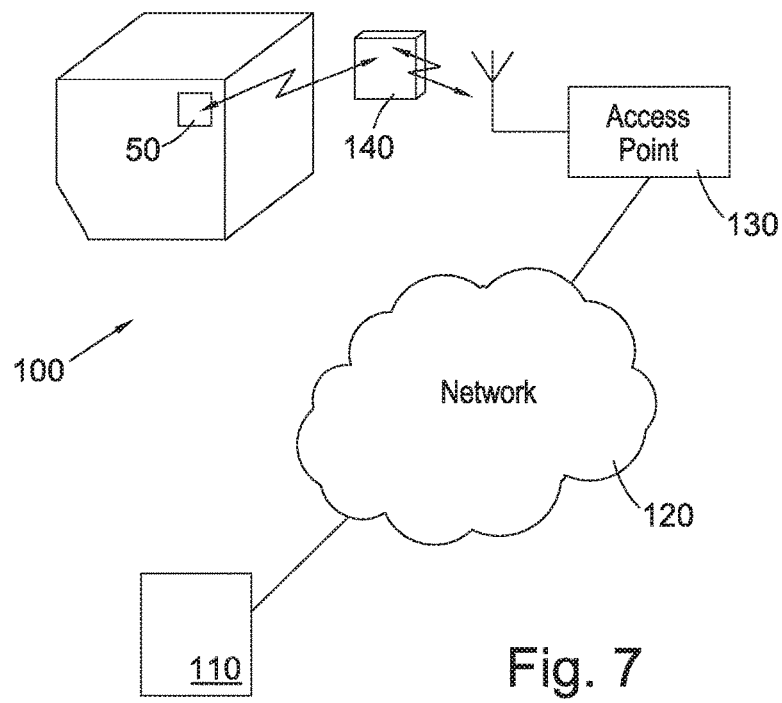
FIG. 7 shows an embodiment of a network including a hand held device interacting with a wireless container tag.

One embodiment of an environment 100 in which a hand held device 140 interacts with a container tag 50 is shown in FIG. 7. The environment 100 is part of an airport and includes a network 120 operated within the airport. The network may be a LAN or WLAN. Alternatively or additionally, the network 120 may also access entities outside of the airport using an internet connection or a VPN. Connected to the network 120 are servers 110 used in the operation of the airport. These may be located at the airport and directly connected to the airport network without having to use means for communicating to outside entities or, alternatively or additionally, be located outside of the airport and connected to via the internet and/or VPN. More details of other parts of the network 120 will be provided below. The network 120 also comprises one or more wireless access points 130. These access points may support wireless connections according to any of a number of protocols, such as the IEEE 802.11 "WiFi" protocols are supported. The wireless access points 130 enable the hand held device 140 to communicate with any other components 110 connected to the network 120 via the network 120 and to transmit to or receive from these components 110 and data or instructions required for its operation or required by the other components 110 of the network. The hand held device 140 in turn communicates wirelessly with the container tag 50, thereby allowing data to be transmitted to the container tag 50 or to be received from the container tag 50. As mentioned above, data relating to the content loaded into a container 10 at a departure airport may be collated in a luggage/cargo handling system (which may be one of the further components 110 of the airport connected to the network 120) of the airport and then transmitted to the container tag 50 for storage therein via network 120, access point 130, and hand held device 140. The data may, alternatively, be collected in a system running on a remote server, wherein data is entered/transmitted to this system via client application operating within the airport. Conversely, data stored in the container tag 50 may be received at the hand held device 140 and then transmitted onwards to other components 110 of the airport network/internet/VPN via hand held device 140, access point 130 and network 120. As will be discussed in more detail below, data from the container tag 50 may also be received at the hand held device 140, alongside other information such as updated flight information, and then processed within the hand held device 140.

Figure 8:
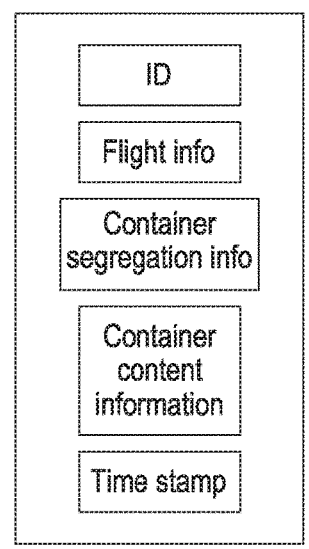
FIG. 8 illustrates data stored within the non-volatile memory of a wireless tag.

Turning now to the data stored within the non-volatile memory 60 of the wireless tag 50, as illustrated in FIG. 8, the non-volatile memory comprises a memory area storing unique ID of the tag 50. This unique ID may correspond to the IATA standard container serial number of the container 10 associated with the tag 50. Alternatively, the unique ID may differ from the IATA standard container serial number of the container 10 but be uniquely associated with the unique ID of the container, so that reading the unique ID of the tag 50 also unambiguously identifies the container 10. As mentioned before, the unique ID may be stored within the tag for identification of the container. However, a unique ID may not be stored in the tag 50 or be used for container identification.

In one embodiment, the tag 50 also stores the flight number to which the stored container content information relates. Additionally, in one embodiment, the tag 50 also comprises a storage field that allows container segregation information that is information relating to the handling of the entire container to be stored. This field may, for example specify that the container holds or is to hold only cargo/luggage relating to a particular class or that the entire container is to be transferred to a particular, named connecting flight upon arrival a the next airport.

The tag 50 may, additionally store a time stamp that can be used to ensure that data stored on the tag is recent data. Alternatively or additionally the tag may store information that uniquely identifies the flight with which the data stored in the tag 50 is associated. Such information may, for example, include the flight number and the date of the flight.

The wireless tag 50 further comprises a storage area for storing information relating the content stored in the container. One example of data or information stored in the non-volatile memory 60 of a wireless tag 50 is shown in Table 1 below.

TABLE 1

| Item ID/Bag tag No. | Item type | Class | Handling Information | ... | Destination | Loading Sequence |
|---|---|---|---|---|---|---|
| 48745 | Luggage | Business | QTB to connecting flight | ... | Onward flight no. XYZ | 7$^{th}$ |
| 79834 | Luggage | Economy | — | ... | Baggage reclaim at original destination airport | 4$^{th}$ |
| 96147 | Luggage | Business | Priority handling | ... | Baggage reclaim at original destination airport | 5$^{th}$ |
| 08435 | Cargo | — | Hazardous substances procedure applies | ... | Receiving center of cargo shipment company | 1$^{st}$ |
| 27325 | Cargo | — | Hazardous substances procedure applies | ... | Receiving center of cargo shipment company | 2$^{nd}$ |
| 14569 | Cargo | — | Direct transfer to onward flight | ... | Onward flight no. ABC | 6$^{th}$ |
| ... | ... | ... | ... | ... | ... | ... |
| 62534 | Mail | — | — | ... | Receiving center of mail delivery company | 3$^{rd}$ |

As indicated in Table 1, various types of cargo can be loaded in individual containers. This does, of course, not have to be the case for all containers and a single container may, alternatively, only carry one type of cargo, say passenger's luggage or two different types of cargo. It will moreover be appreciated that the present disclosure encompasses any type of cargo that may be carried on an aircraft. Whilst in the example of Table 1 the type of cargo is identified in the data stored in the non-volatile memory 60 of the tag 50, this information may instead be omitted.

The items of cargo identified in the data stored in the non-volatile memory 60 are individually loadable items. However, these items of cargo themselves may include a plurality of items, as is the case with a mail bag. Some such items may be identified by a unique item identifier. One way of identifying luggage, for example, is by using individually identifiable electronic tags permanently attached to passengers' luggage. IDs of these tags or IATA bagtag numbers can either be stored as the item ID in the first column of Table 1. Alternatively, the individual IDs of luggage items may be added to a database operated by an airline when the passenger checks his or her luggage in for a flight and/or be permanently stored in the airline's database once it has been entered and associated with an individual item ID on a flight by flight basis. The individual item ID that has been associated with the piece of luggage is then stored in the non-volatile memory 60 of the tag 50. In this manner, a single ID format for storage in the non-volatile memory is used.

In addition to the above mentioned data, the non-volatile memory 60 may also store the travel class in which the owner of a piece of luggage carried in the container 10 comprising the tag 50 with the non-volatile memory 60 is travelling. On the basis of this information, preferential treatment can be given to containers 10 comprising pieces of luggage belonging to first class or business class passengers.

The data stored in the non-volatile memory 60 may indicate how the individual piece of luggage is to be handled upon arrival. If a passenger has, for example, booked a connecting flight, the luggage should be loaded onto the connecting flight instead of being delivered to baggage reclaim. If the connecting flight leaves shortly after the arrival of the flight carrying the piece of luggage, then a tail-to-tail transfer (also referred to as quick transfer bag/QTB) directly to the connecting flight avoiding the luggage distribution center at the stop over airport may be necessary. Handling information of this nature is also stored in the non-volatile memory 60 of the tag 50, alongside the destination to which particular pieces of cargo are to be transferred. The destination information may also comprise information regarding the destination of any connecting flight.

In one embodiment, the non-volatile memory 60 may store information regarding the order in which the pieces of cargo have been loaded into the container 10. By considering this information, luggage handlers can more easily determine in which part of the container 10 the piece of cargo is located, so that the piece of cargo can be found more quickly and handled in the manner indicated by the handling information more expediently. Additionally or alternatively, information regarding the exact location of the piece of luggage in the container may also be stored in the non-volatile memory. U.S. patent application Ser. No. 14/789,080, the entirety of which is incorporated herein by reference for all purposes, and European Patent Application No. 15290169.0, the entirety of which is incorporated herein by reference for all purposes, describe systems suitable for this purpose.

It will be appreciated that the above discussed data items are only examples and that other information can be stored within the wireless tag 50 as well. In one embodiment, for example, the information, such as the passenger's name, that is required to link a particular piece of cargo to a passenger on the aircraft may be stored.

Figure 9:
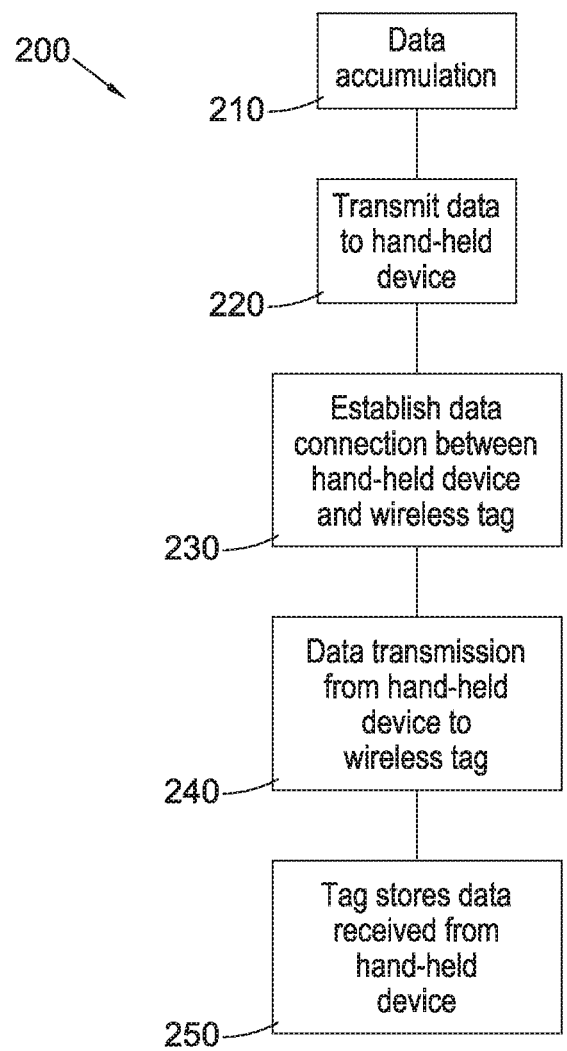
FIG. 9 shows a process of transferring data to a tag.

FIG. 9 shows a process 200 of storing data on the wireless tag 50 when or shortly after finishing loading of the container 10 at a departure airport. In step 210, data summarizing the cargo loaded in the container is accumulated, either in a luggage/cargo control system of the departure airport, in a remote server as discussed above or in the hand held device 140 on the basis of data received from the airport's luggage/cargo control system or the remote server. The accumulated data, if accumulated outside of the hand held device 140, is then transmitted to the hand held device 140 in step 220. In an embodiment, the hand held device 140 accesses a WLAN operated by the departure airport and enters into data communication contact with the luggage/cargo control system of the airport or the remote server.

Once a data connection between the luggage/cargo control system and the hand held device 140 has been established, the data accumulated in step 210 is transferred to the hand held device in step 220. The data transfer may be initiated by the hand held device 140 sending a request for data to be transferred to the hand held device 140 from the luggage/cargo control system.

After transfer of data to the hand held device 140 in step 220, the hand held device establishes a data connection to the wireless tag 50 in step 230 and transmits, in step 240, the accumulated/received data to the tag 50 together with instructions executable by the tag 50 to store the data in the part of the tag's non-volatile memory reserved for the storage of container contents information. In step 250, the tag 50 stores the received data in the part of its non-volatile memory reserved for the storage of container contents information. The tag 50 also stores a time stamp indicating when the data were received and/or information that allows unambiguous identification of the flight to which the data relates.

Figure 10:
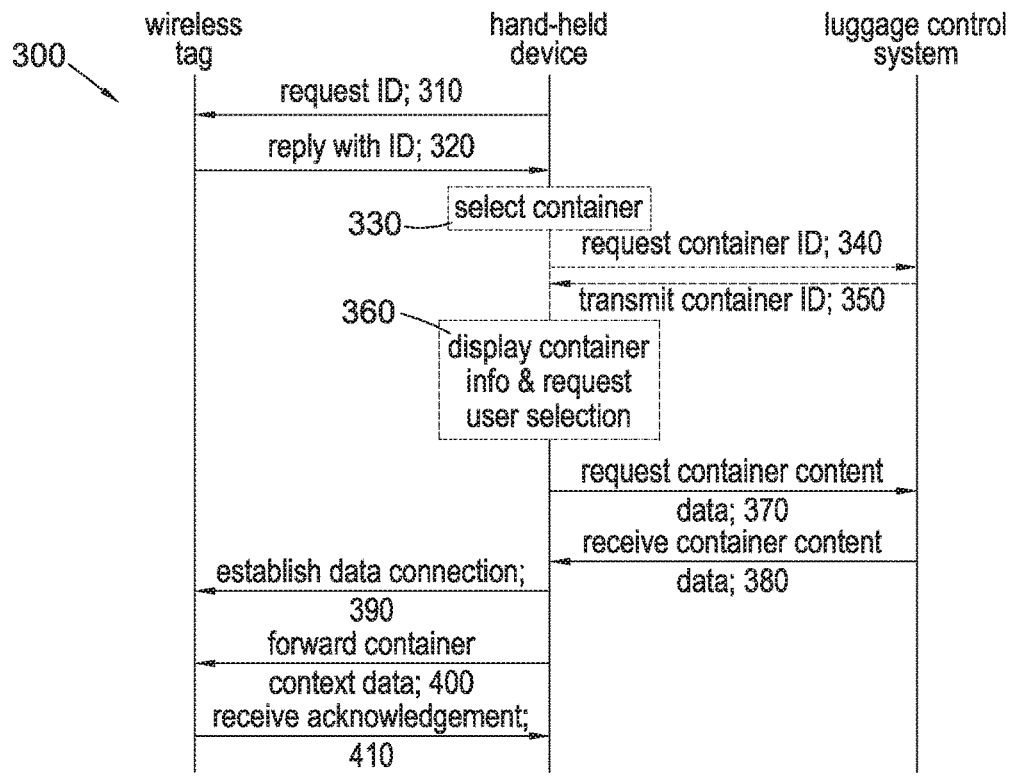
FIG. 10 shows a process of storing data on a wireless tag.

FIG. 10 shows a sequence 300 of data and command transfer implementing the method discussed above with reference to FIG. 9. In a first step, performed in one embodiment as a luggage handler approaches a container 10 having a tag 50 to which container content data is to be written, the hand held device 140 sends a multicast request for IDs of any container tags 50 in its vicinity in step 310. Containers in the vicinity reply by transmitting their unique ID in a reply (multicast) message 320. In step 330, the hand held device 340 either selects the container ID with the largest signal strength on the basis that it belongs to the container closest to the hand held device 140 or displays information relating to this container ID to the user/handler of the hand held device 140 on a screen of the hand held device 140. The information provided to the handler may either be the received IDs as such or, in the more likely case that the ID differs from a unique ID of the container 10, the hand held device 140 sends a request to be provided with the unique ID of the container 10 in step 340 to the luggage/cargo control system or to a third party system storing information that associates the unique ID of the tag 50 with the unique ID of the container 10. In step 350, the unique ID of the container(s) 10 covered by the request sent in step 340 are transmitted to the hand held device 140, alongside further container information. The further container information may be standard information including container size and weight. In step 360, the received container IDs are displayed by the GUI of the hand held device 140 on a screen of the hand held device 140 and the user is requested to provide an input selecting the container he or she is presently working on. It will be appreciated that, if the hand held device can select the container automatically on the basis of the received tag ID then steps 330 to 360 may be optional. As an alternative, the hand held device 140 may already store a database that links unique IDs of containers 10 on the airport premises with the unique IDs of the tags 50 carried by the containers, so that steps 340 and 350 can be omitted. Such a database may be updated within the hand held device 140 on a regular basis, for example every hour, every quarter or half day or every day.

In a further embodiment, the hand held device 140 may be configured to present to the cargo handler a list of flights that need to be handled. The cargo handler may then choose the flight he or she is about to handle whereupon the hand held device 140 displays the container numbers of the containers 10 that are to be loaded onto the selected flight. These container IDs, if different form the IDs of the container tags 50 located on the containers 10, are also associated with the IDs of the container tags 50 located on the containers 10.

Once the container 10 to which container content data is to be transmitted has been selected, the hand held device 140 sends a request for data detailing the container content and identifying the selected container 10 to the luggage/cargo control system in step 370. The luggage/cargo control system provides the requested data in step 380. Following receipt of the container content data, the hand held device 140 establishes a data connection with the tag 50 associated with the selected container 10. Whilst the request for an ID sent in step 310 may have been a multicast message, the request initiating establishing a data connection is addressed solely to the tag 50 in question. Once the data connection has been established between the hand held device 140 and the tag 50, the container content data is transmitted from the hand held device 140 to the tag alongside a command for execution by the tag 50, instructing the tag 50 to store the container content data in the part of its non-volatile memory reserved for such storage. Also provided may be the information required by the tag 50 to store a time stamp of the information uniquely identifying the flight to which the data relates.

In step 410, the container tag 50 sends a reply acknowledging receipt of the data and/or successful completion of the storage operation.

It will be appreciated that, if the container contents data is already available on the hand held device 140 after step 360, say for example because the data has been transmitted to the hand held device 140 before, such as by and by during the container loading process, then steps 370 and 380 may, of course, be omitted.

Figure 11:
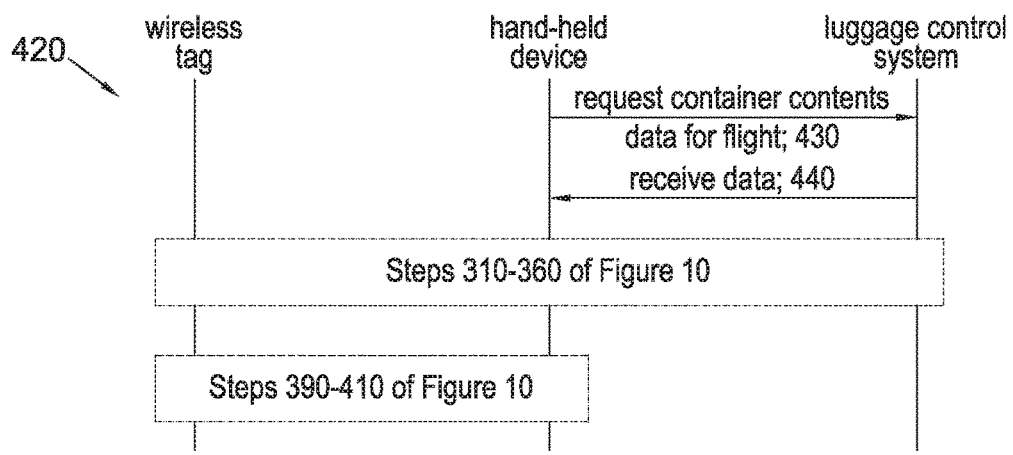
FIG. 11 shows another process of storing data on a wireless tag.

FIG. 11 shows an alternative sequence 420 of data and command transfer implementing the method discussed above with reference to FIG. 9. In step 430, the hand held device 140 requests from the luggage/cargo control system to receive all container contents information relating to a particular flight. This information is transmitted from the luggage/cargo control system to the hand held device 140 in step 440. Thereafter those of steps 310 to 360 needed to identify the container being loaded are performed. These steps will not be described again and reference to the discussion relating to FIG. 10 above is instead made. Thereafter steps 390 to 410 of FIG. 10 are performed. These steps will not be described again and reference to the discussion relating to FIG. 10 above is again made.

Once the container content data has been stored on the wireless tag 50, the container 10 is ready for loading onto the aircraft. The aircraft may comprise a sensor at its cargo door for checking whether or not data has been stored on the tag 50, when the data has been stored on the tag 50 and/or the flight identifying information stored on the tag 50. In case the information received from the tag 50 does not correspond to expected information, a cargo handler is alerted in one embodiment. Alternatively or additionally, the hand held device 140 sends confirmation to the luggage/cargo control system that container contents data has been written to the wireless tag 50 at the container 10. The luggage/cargo control system then verifies that the relevant confirmation has been received for all containers to be loaded or loaded onto the flight before allowing the flight to be closed. For this purpose, the hand held device 140 is connected to the baggage control/reconciliation system of the origin airport.

Figure 12:
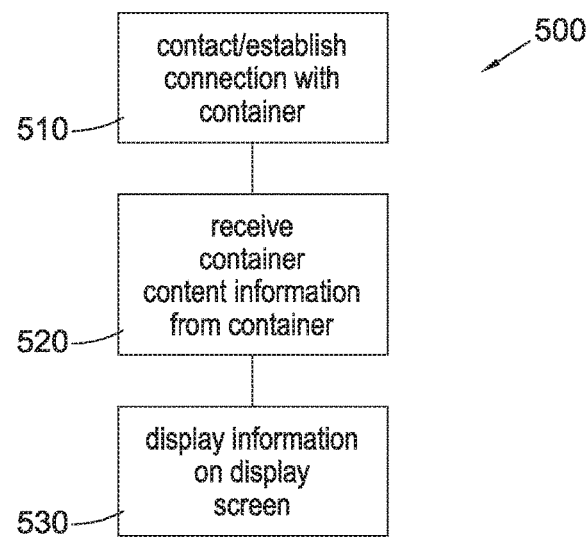
FIG. 12 shows a method of acquiring and displaying information stored on a wireless tag.

Turning now to processes following the arrival of an aircraft at a destination airport. During unloading of a container 10, a hand held device 140 used by a cargo handler at the destination airport is used to contact and establish a data connection with containers 10 being unloaded from the aircraft as shown in step 510 of the method 500 illustrated in FIG. 12. The steps performed to establish the data connection may be the same as steps 310 to 360 discussed above with reference to FIG. 10 and will consequently not be discussed again in the present context. Once the data connection with a particular container has been established, the hand held device 140 receives, in step 520, the container content data stored in the non-volatile memory of the wireless tag 50 associated with the container 10. Transfer of this data is, in one embodiment, initiated by the hand held device 140 sending a request for transmission of the data to the wireless tag 50. After receipt of the container content information at the hand held device 140, received data is displayed on a screen of the hand held device 140 by the GUI of the hand held device 140. It will be understood that it is not necessary for all of the received data to be displayed in this manner. In one embodiment, in particular, only the information needed by a cargo handler to correctly handle the cargo in the container in question is displayed. For example, if the default action undertaken by the cargo handler after unloading a container from the aircraft is to transport the container to a cargo sorting center at the airport, then the information that is displayed in one embodiment is only information that relates to those pieces of cargo that should be handled on a more urgent basis and that should not be delayed by an initial transfer to a cargo handling area. The hand held device 140, for example, when used at the aircraft cargo doors, may display to the cargo handler which items of cargo need to be handled preferentially immediately after unloading of the container from the aircraft. The information displayed in this regard at least includes information allowing the cargo handler to identify a particular piece of cargo 20 and information regarding the handling required for this piece of cargo 20. Information for identifying the cargo 20 may include the ID stated in the left hand column of Table 1 if the ID allows the handler to identify the piece of cargo 20, the loading sequence stated in the right hand column of Table 1 and/or the cargo type.

The above process of connecting to the wireless tag 50 on a container 10 may also be performed while the container 10 is, alongside other containers, still/already on the aircraft. In this situation, a reader/hand held device 140 is likely to be able to connect to more than one of the wireless tags 50 at any one time. To ensure that information received from tags 50 can be correctly attributed to a particular container 10, the tag 50 transmits its ID and/or the container number to a reading device, such as a hand held device 140 interrogating the tag 50. In this fashion, a hand held device 140 can be used by the cargo handler to interrogate the data stored within a particular tag 50 or to systematically interrogate a series of tags 50. In this fashion, the container holding a particular piece of cargo can more easily be identified. Put in other words, the search for a particular item of cargo can be customized. This is advantageous in situations in which a particular piece of cargo ought to be located quickly, say for example when it is desired to unload this piece of cargo from the aircraft.

Figure 13:
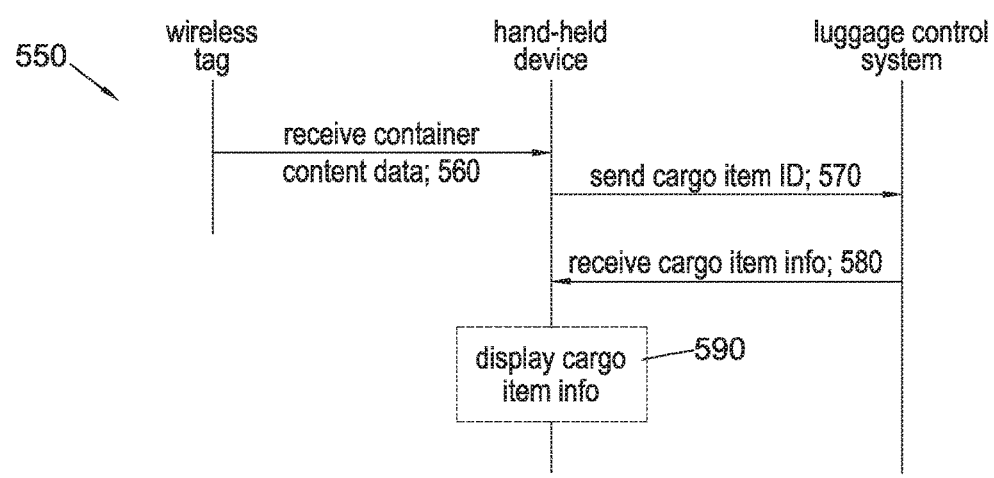
FIG. 13 shows information flow in a cargo handling process in an airport following the arrival of an aircraft.

FIG. 13 illustrates an embodiment of a method 550 in which the hand held device 140 receives container content information in step 560. The steps associated with connecting to the tag 50 and requesting the information have been described in detail above and, while performed in the process illustrated in this figure, will not be described again in the present context. If a particular item of cargo is to be identified but the necessary information is not available at the hand held device 140, the hand held device 140 in one embodiment sends a request for further identifying information to the luggage/cargo control system in step 570. In step 580, the luggage/cargo control system provides any further identifying information to the hand held device 140. This information may then be displayed on the hand held device 140. Relevant information may include the type of cargo concerned, a type of luggage item, such as the name of the manufacturer of the item, the item type, for example whether or not the item is a hard shell or soft shell suitcase, a rucksack, a bag, the item color, any unusual distinguishing features of the item, the name of the company shipping goods or mail, the type or nature of a container comprising goods or mail etc. In one embodiment, a photograph of a cargo item to be identified may be stored by the luggage/cargo control system or by a third party system to which the cargo control system has access. An image of this nature may have been provided by the proprietor of the cargo item prior to shipping or by the departure airport before departure. Any such photograph may be provided by the luggage/cargo control system to the hand held device 140 and displayed there to a handler. A system that provides data of this nature is disclosed in U.S. patent application Ser. No. 14/789,080, the entirety of which is incorporated herein by reference for all purposes, and European Patent Application No. 15290169.0, the entirety of which is incorporated herein by reference for all purposes.

It is emphasized that nothing in the above disclosure is intended to suggest that the hand held device 140 is only to be used at the aircraft cargo door. Instead, the hand held device 140 can be used at any stage of the processes associated with loading and unloading containers 10. Equally the hand held device 140 may find use in any location of the airport associated with such activities. The hand held device 140 may be configured to determine its own location within the airport, for example by using GPS location techniques or by determining its location by analyzing the properties of available wireless communication networks. Alternatively, the hand held device 140 may comprise a function that displays an input interface to its users, whereby the user is requested to provide location information.

In one embodiment, the hand held device 140 simply displays information detailing the handling of all cargo items in a particular container 10 in question. In one embodiment, the hand held device 140 is, however, configured to, on the basis of location information, only display those data that are relevant to the present context. The above discussion regarding limiting the display of data to items that need to be handled expediently when the containers 10 just unloaded form the aircraft are being dealt with is but one example of this.

The above discussion has thus far focussed on container content information in the format it has been stored in the tag 50 prior to departure. As mentioned above, however, aircraft delays are not uncommon and not infrequently lead to passengers being required to change their travel plans if it becomes difficult or impossible to get to a connecting flight before its departure. In other cases of course passengers may voluntarily, or at least for reasons not directly related to their current journey, change their travel plans. This may include a change in the connecting flight that is to be used. Details of a system permitting such changes are provided in U.S. patent application Ser. No. 14/727,150, the entirety of which is incorporated herein by reference for all purposes, European Patent Application No. 15290143.5, the entirety of which is incorporated herein by reference for all purposes.

Figures 14, 15:
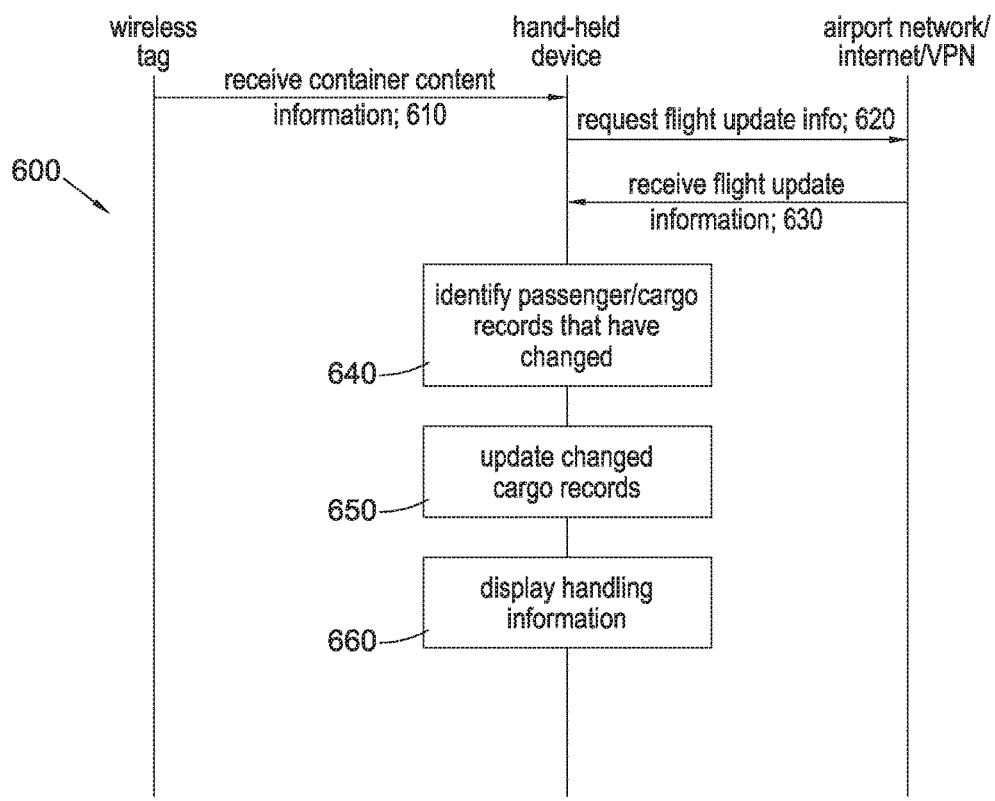
FIG. 14 shows information flow in a further embodiment involving updating information received from a wireless tag.
FIG. 15 shows an example of a display screen of a hand held device.

For a passenger to change future flight plans either during a current flight or following the (delayed) arrival of the current flight, the passenger needs to go through a booking routine that secures him or her a place on the desired replacement connecting flight. The resulting change in the passenger's connecting flight details become available at the computing network of the stop-over airport. FIG. 14 shows a method 600 for displaying updated cargo handling information on a hand held device 140. In step 610, the information stored in the non-volatile memory of the wireless tag 50 is received. The detailed manner in which the hand held device 140 and the tag 50 interact prior to the transmission of the data is discussed above and, while being performed as part of the method 600, is not described in detail again here.

In step 620, the hand held device 140 contacts the airport's network and requests an update of passenger information or cargo information relating to a particular flight currently being processed. As part of step 620, the hand held device provides information allowing the flight in question to be uniquely identified to the network and/or the remote servers in communicative connection with the airport network. It will be appreciated that, in referring to the network, reference is made to contact being established with computing apparatus that forms part of or is connected to the airport network or to sources that are connected to the airport network but lie outside of the airport network (such as an airline's passenger booking system, for example) and that holds the required updated information. In step 630, the required updated information is transmitted to the hand held device 140.

It will be appreciated that steps 620 and 630 do not have to be performed after data has been received from a wireless tag 50. Instead the data from the tag 50 may be received after the updated information has been received at the hand held device 140.

In step 640, the hand held device 140 compares the data received from the wireless tag 50 with the received updated information. If it is determined in the comparison that there is updated information relating to cargo items in the container 10 being processed at the moment, then the hand held device 140 amends the data received from the wireless tag 50 so that the amended data reflects the updates correctly. The updated data is then displayed to the handler on a display device of the hand held device 140 in step 660 so that the cargo in the container can be handled in the appropriate fashion according to the updated data. Optionally, the amended data is transmitted to the tag 50 for storage by the hand held device 140 in the same manner as described above with reference to steps 390 to 410 of FIG. 10.

Figure 18:
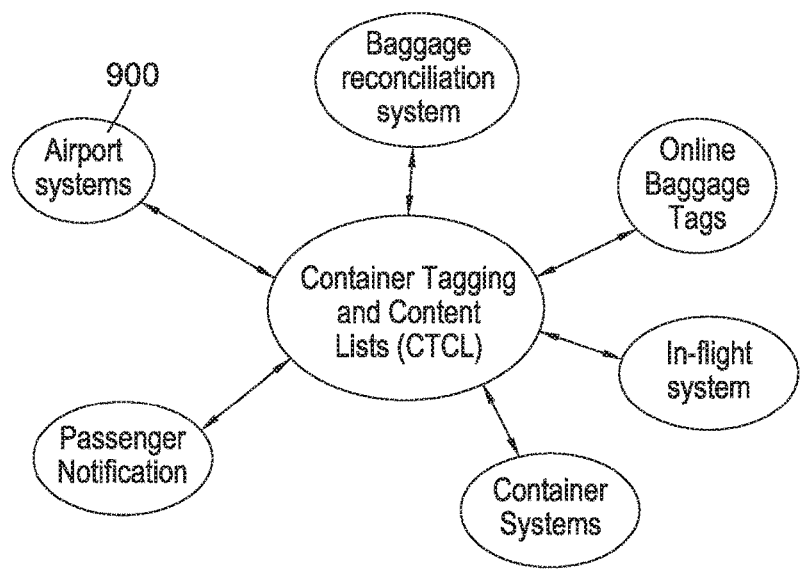
FIG. 18 shows data sources connected or connectable to the system of an embodiment managing container tagging and content lists.
Figure 19:
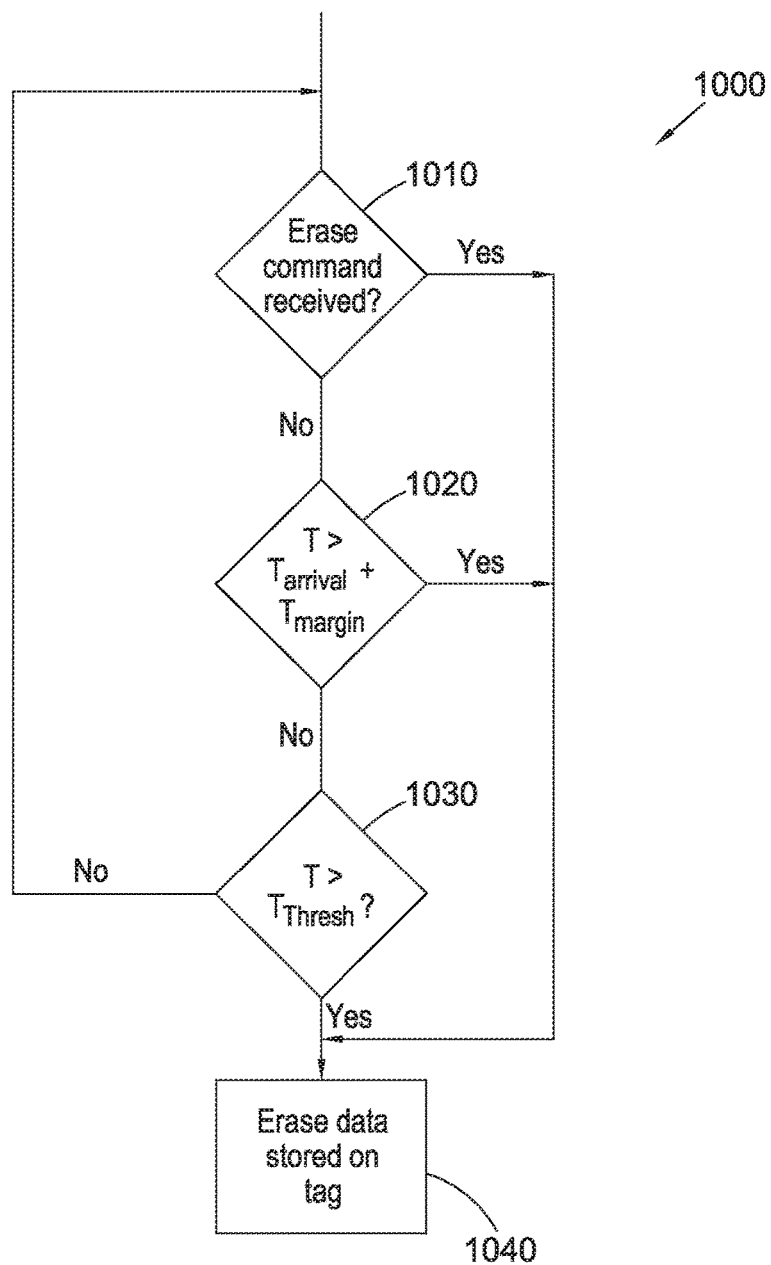
FIG. 19 shows a process of erasing data stored on a wireless tag.

Reference is made to FIG. 18, discussed in more detail below, shows systems that may form part of the airport network or that may be in communicative contact with the airport network, say via the internet or VPN, for the purpose updating/exchanging data with the hand held device 140.

FIG. 15 shows a display screen 700 of hand held device 140 on which some or all of the data received from a wireless tag 50 at a container 10 is displayed to a cargo handler. As can be seen, information displayed may include the bag tag number (column 710), the cargo type (column 720), the color of the cargo (column 730), onward handling information (column 740), if applicable information identifying a flight to which the charge needs to be transferred (column 750), the travel class of the passenger owning the piece of cargo in question (column 760) and the loading sequence number (column 765) indicating the order in which the bag has been loaded into the container 10.

In one embodiment, the information displayed on the display screen 700 can be modified by a user. In one embodiment, the rows can be rearranged so that they are presented in an order selected by a user. Such an order may be determined by sorting the rows so that information in a particular column is presented in ascending or descending alphabetical or numerical order or grouped so that rows having identical entries in a particular column are presented alongside each other.

An alternative way of changing the information displayed is to filter the rows so that only a sub-set of the rows is displayed. One way of filtering could be to only display rows that have a particular value or range of values in a column specified by a user. Such filtering is, in an embodiment, combined with the above described sorting.

The hand-held device may comprise user input means to allow the user to initiate a desired sorting or filtering. Such user input means may take the form of a touch sensitive screen or any other user input means.

Rows relating to a particular type of onward handling information may be visually identified as relating to this same type of onward handling information. This is illustrated in FIG. 14 by way of hatching and cross-hatching but can, more preferably, be implemented on a display screen of the hand held device 140 using different colors underlying different types of onward handling information. Any type of visual distinction applied to the display is preferably indicative with the degree of urgency associated with the handling of the piece of cargo. Row 770 shown in FIG. 15, for example, relates to an item of cargo in the most urgent handling group and may be presented against a red background. The next urgent group/item, an example of which is shown in row 780, may be presented against a different colored background or against a background of the same color but with a different intensity as long as the groups are distinguishable. The same applies to other groups. The group that needs to be dealt with least urgently may be presented against a neutral background, for example. Whilst in the above reference is being made to groups, it will be appreciated cargo items having the same onward handling requirements may not be presented in groups.

It will of course be appreciated that more or less information may be displayed on the screen. The invention is not limited to the exact information items shown in this figure. It is moreover envisaged that, in one embodiment, only cargo items that need to be dealt with in the same manner or with the same degree of urgency are displayed simultaneously on the screen. The hand held device 140 may, for example, group all cargo items in a container 10 that need to be transferred to connecting flights tail-to-tail or all cargo items in a container 10 that need to be transferred to the same connecting flight tail-to-tail in one display on a screen so that cargo handlers can focus on these items first. The hand held device 140 may further provide an input means by which the cargo handler can confirm that the displayed items have been handled in the manner instructed on the screen. Once confirmation for all displayed items has been received the hand held device 140 may display the next group of cargo items to be dealt with. This next group may, for example, comprise all cargo items in the container 10 that need to be transferred tail-to-tail to a different flight or all cargo items that need to be transferred to other flights but where sufficient time is available for this transfer to go through the transfer hall. Groups of cargo items can thus be displayed in subsequent displays, ordered by their urgency. Subsequent displays may be displayed once confirmation that all cargo items on one display have been handled as instructed has been received via the GUI of the hand held device 140.

In one embodiment, data relating to individual cargo items may be selectable so that further information can be displayed on the screen. Selection of such a data item may, for example cause the hand held device 140 to display a photograph of the cargo item, if provided to the hand held device 140, in question together with a loading sequence number. Display of information in this fashion is particularly advantageous as it allows cargo handlers to quickly identify items that need to be handled expediently.

Figure 16:
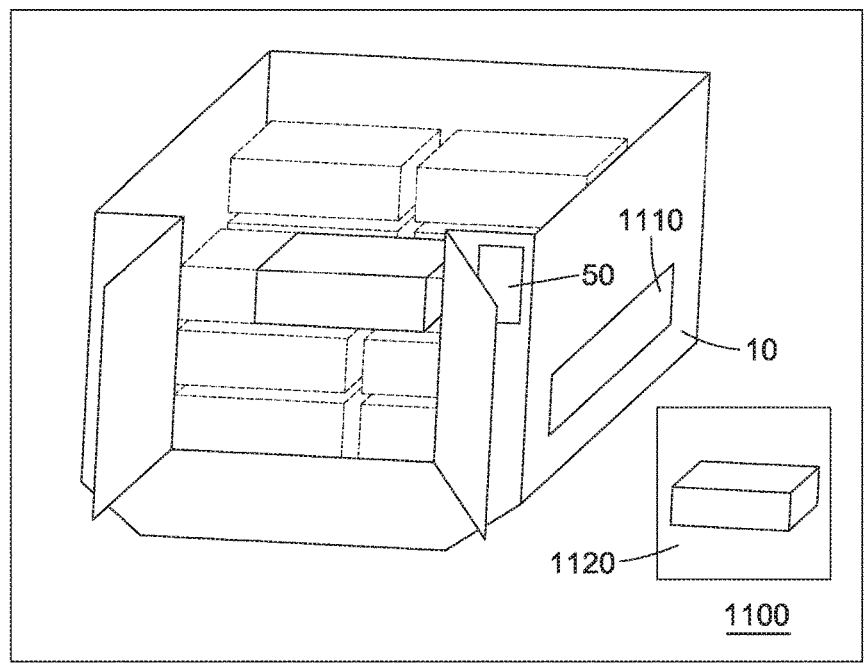
FIG. 16 shows an example of another display screen of a hand held device.

FIG. 16 shows a display 1100 provided on a hand held device 140 to indicate to a cargo handler where, in a given container 10, the cargo handler is most likely to find a particular item of cargo. As discussed, the information stored in the non-volatile memory of tag 50 can include loading sequence information indicating wherein the container individual items of cargo are located. The order in which the loading positions are enumerated is known and may, for example, be a default sequence that, in the absence of any indication to the contrary, is known to be used for loading any container. Alternatively the sequence of loading may be a particular sequence of loading specified by a ground handling company loading the containers 10, by an airport or by an airline.

By knowing the loading sequence number, the location of the piece of cargo in question can easily be determined. In the display illustrated in FIG. 16 the piece of cargo is displayed in the location it is believed to have according to the loading sequence number. All other pieces of cargo may or may not also be displayed, albeit, if they are displayed, it is preferred for these other pieces of cargo to be displayed in a fashion that makes them less prominent in the display than the piece of cargo that is to be located. They can, for example, be simply shown as "see-through" outlines, while the piece of cargo in question is shown in solid outline or, if available, displayed as a photograph of the piece of cargo. The container number 1110 may also be displayed on the display to ensure that the cargo handlers work on the correct container 50. Additionally, a photograph 1120 of the piece of cargo may be displayed on the display 1100 if the piece of cargo is not identified by its photograph in the above discussed manner.

In addition to allowing cargo handlers to handle cargo correctly and more expediently, the hand held device 140 may not only display the information received from the wireless tag 50 but may also forward the information to the arrival reconciliation system of the embodiment, in particular to a luggage reconciliation system in the airport. This reconciliation system in turn updates the pax/cargo systems. The luggage information may be sent to the luggage reconciliation system together with location information indicating the current location of the hand held device 140/container 10. The cargo information may be transmitted by the hand held device 140 to the arrival reconciliation system introduced here includes an indication of the action taken by the cargo handler regarding the individual pieces of cargo. In this manner, the whereabouts of individual pieces of cargo becomes known to the arrival reconciliation system, which forwards this location information to the pax (passenger) notification system. This enables the reconciliation system to inform expecting recipients of the pieces of cargo of its likely time of arrival. For example, if a piece of luggage is to be transferred quickly/QTB to the cargo door of a connecting flight, the crew of the connecting flight may be informed of any delays in the delivery of the piece of luggage. For situations where luggage is transferred to luggage reclaim, the arrival reconciliation system may display the likely time to arrival of luggage at the reclaim belt.

The hand held device 140 may, when sending the information received from the wireless tag 50 (amended as appropriate in view of update information available as is also the case in the above discussed arrangement) to the reconciliation system, also group the pieces of cargo in the groups in which they will be delivered to the reconciliation system, for example on a container by container basis. The reconciliation system in one embodiment then directs different groups of luggage to different reclaim bands to ease congestion at reclaim bands and/or to allow serving different travel classes at different reclaim bands independent from each other.

The reconciliation system may additionally track the location of a container as it progresses through the airport. For this purpose, fixedly installed wireless transceivers that can establish a data connection with wireless tags 50 passing by and that, while this connection exists receive at least a unique ID of the tag 50 and/or the container 10 from the tag 50. This information is then transmitted to the luggage reconciliation system. The luggage reconciliation system is aware of the location of the transceiver so that the information received from the transceiver allows updating information regarding the expected arrival of luggage at its destination. In one embodiment, the reconciliation system displays updated information to waiting passengers or provides similar information to waiting crew of connecting flights. In another embodiment, the reconciliation system sends an updated timing message to passengers each time a container's location is determined in this manner. Such messages may be sent to passenger's personal communication devices, for example. The passengers in one embodiment are equally informed of the reclaim belt the luggage will arrive at in the same manner.

The reconciliation system in one embodiment additionally combines the information received from the hand held device 140 with information acquired through the system described in U.S. patent application Ser. No. 14/789,080, the entirety of which is incorporated herein by reference for all purposes, and European Patent Application No. 15290169.0, the entirety of which is incorporated herein by reference for all purposes.

In the same manner, as a luggage reconciliation system receives up-to-date information regarding the location of luggage, the hand held device 140 may send, or the airport network or server outside of the airport network but communicatively connected to the airport network may forward, information relating to cargo on to the handling systems of cargo transporting companies to all real time tracking of cargo.

Figure 17:
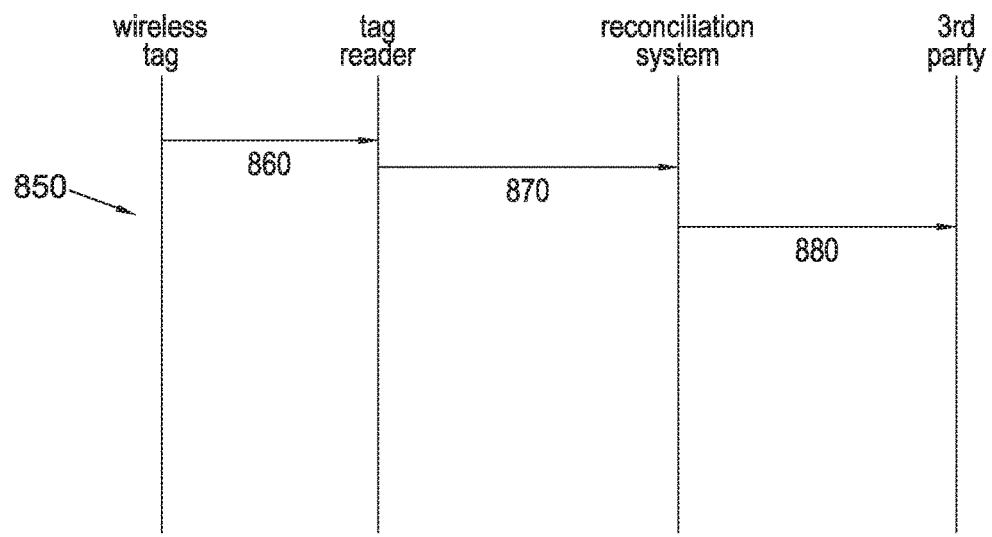
FIG. 17 shows information flow in a further embodiment.

The above process is shown in FIG. 17. The process 850 includes the transmission of data from the wireless tag 50 to a tag reader. The tag reader may be the hand held device 140 referred to above, a fixedly installed tag reader in the airport or in its simplest for a tag reader that only reads information from the tag sufficient to identify the tag without at the same time also reading all of the container content data stored on the tag. In step 860, data is transferred from the tag 50 to the tag reader. The steps required to establish the relevant data connection between tag 50 and tag reader are the same as those discussed above with reference to the hand held device 140, so that these steps will not be repeated. The tag reader in turn forward the received information to the reconciliation system, be that a luggage or other cargo reconciliation system, in step 870. The reconciliation system in turn parses the information received and directs data to 3rd parties requiring the information by forwarding the relevant extracted data, in step 880.

It is emphasized that, in the embodiment of FIG. 17, the information the tag reader receives from the wireless tag 50 may not be displayed at the tag reader. Of course, if the tag reader is the hand held device 140 used by the cargo handlers in the manner described above, then providing such a display is advantageous. Conversely, however, if the tag reader is one that is fixedly installed in the airport for tracking the movements of containers through the airport, then no such display is needed. Equally, once the content of the container is known, be that because the data stored on the wireless tag 50 had been read earlier and provided to the reconciliation system or because the airport has received the data through a known paid service, it is not necessary to re-read the data on the wireless tag 50, so that, as described above, the simple reading of the tag ID suffices for tracking the container and its content.

FIG. 18 illustrates a number of airport or third party systems the container tagging and contents lists held/used in an airport and stored on the wireless tags 50 are influenced/updated by. The airport systems 900 provide updated flight information. This may include updated passenger information that requires the addition/removal of luggage information to/from a content list. The airport systems 900 may also provide information on whether or not a connecting flight has already left so that handling information on content list of late arriving incoming flights can be amended appropriately. The baggage reconciliation system provides the information required for the container tagging and control lists to be collated at the departure airport and is provided with the container content data at the arrival airport for processing in the above described manner.

The online baggage tags system is described in U.S. patent application Ser. No. 14/789,080, the entirety of which is incorporated herein by reference for all purposes, and European Patent Application No. 15290169.0, the entirety of which is incorporated herein by reference for all purposes, and provides luggage identification information (such as an image of the piece of luggage) to the hand held devices in the above described manner.

The in-flight system is described in U.S. patent application Ser. No. 14/727,150, the entirety of which is incorporated herein by reference for all purposes, European Patent Application No. 15290143.5, the entirety of which is incorporated herein by reference for all purposes, and provides updated travel information. This updated travel information is used, in the above described manner, to update handling information within the hand held device.

The container tagging and content lists are also provided to the passenger notification system to allow passenger notification in the above described manner.

Updated information may be available at a per flight basis and, in one embodiment, the updated information is received at the hand held device 140 so that all updated information relating to a flight is available at the hand held device 140 at the same time. The hand held device 140 is configured to push the updated information relevant to the content of a particular container 10 to the container 10 for storage in the container's tag 50 as and when the hand held device 140 connects with the tag 50 of the container 10.

Aircraft containers are uniquely identifiable. Despite this, it is not uncommon that containers get misplaced and end up in airports in which they are not expected or needed. The container tagging embodiment described above, in one embodiment, provides the unique ID of a wireless tag 50 to container systems tracking the whereabouts of containers every time the tag 50 of a container 10 is detected. This allows providing up-to-date container location information. More generally, in one embodiment, up-to-date information is provided between individual components within the system shown in FIG. 18 every time new updated information is available alongside a suitable data connection between the source of the updated data and any entity requiring the update.

The container Tagging and Content List (CTCL) shown in FIG. 17 may be implemented as a database that is in communicative connection with one or more of the other systems/databases shown in FIG. 17 for data exchange and updating of data within the CTCL and/or the other systems/databases. In this embodiment, the hand held device 140 then simply communicates with the CTCL to acquire update information and/or to send updated information to the CTCL. One example in which updated information is required is described above with reference to changes in passenger's travel plans that are communicated to the CTCL by in-flight systems. Conversely, the hand held device 140 or, more generally, readers around the airport provide information regarding the container's 10 or cargo's whereabouts within the airport to the CTCL for further transmission to the Passenger Notification system.

It will be appreciated that a server hosting the CTCL and storing its data will be configured to establish communicative connections with other systems and databases for the exchange of up to date information and, for this purpose, execute computer executable instructions that enable it to establish these connections. It will be appreciated that, instead of a server centrally holding the CTCL, individual hand held devices may comprise and be able to execute computer executable instructions for contacting one or more of the systems and databases shown in FIG. 17 as being in communicative connection with the CTCL. In one embodiment, therefore, the CTCL does not need to be hosted by a server but exists in concept only. The hand held device 140 in this embodiment contacts the systems and databases shown in FIG. 17 as being in communicative connection with the CTCL individually or jointly, providing acquired information to these systems and databases or requested updated or up-to-date information from these systems and databases in the same or a similar fashion as it would have requested this information from a server hosting the CTCL.

It will be appreciated that the CTCL is part of an arrival reconciliation system in an airport or, should no such system exist, be a stand-alone system that can forms the basis for handling arriving luggage.

Once the container 10 has been unloaded, it is desirable for the data relating to the cargo that had previously been stored in the container 10 to be erased from the wireless tag 50 attached to the container 10 to avoid situations where, once the container 10 has been loaded in readiness for a later flight the incorrect container content data is inadvertently retained on the wireless tag 50. It is preferred for a container 10 with a tag 50 that does not contain any container content data to be shipped, rather than for container 10 to be shipped with a tag 50 comprising incorrect information. FIG. 18 shows a process 1000 for ensuring that the wireless tag 50 is erased. This process is implemented by one of the controllers 70/80 of the wireless tag 50 shown in FIG. 3 by executing processor implementable instructions stored on a non-volatile memory of the tag 50, such as on non-volatile memory 60 shown in FIG. 3. The tag 50 draws the energy required for implementing this process using the processor 70/80 from a tag internal battery.

In step 1010, it is checked if an erase command is received from at the wireless tag 50. Should this be the case, the process 1000 proceeds to step 1040 and erases any cargo related information from the non-volatile memory 60 of the tag 50. If no erase command has been received, then the process checks, in step 1020, if the current time T is later than a known arrival time Tarrival of the flight that was supposed to carry the container 10 carrying the tag 50 in question plus a time Tmargin allowed for processing/handling the container 10 at the arrival airport. The time monitoring required for performing step 1020 may either rely on absolute timing information in situations in which the tag 50 has received a time stamp prior to the flight, for example from a hand-held device 140 upon storage of the container content information in the tag 50 prior to departure. Alternatively, the tag 50 may be configured to determine that the time period Tarrival+Tmargin has been exceeded if the time (as monitored by the tag 50) since the tag has last been written to exceeds a known estimated flight time stored in the tag plus Tmargin. If it is determined that T>Tarrival+Tmargin, then the process moves to step 1040 for data erasure as described above. Otherwise, the process moves to step 1030.

In step 1030, the tag checks if the time T that has passed since data from the tag 50 has last been read by a reading device at the destination airport exceeds a threshold time TThreshold. Should this be the case, then the process proceeds to step 1040, the above discussed data erasure step. Otherwise the process 1000 moves to its beginning for a further checking cycle. It will be appreciated that step 1030 can only be reliably performed if a reader transmits information indicating the airport in which it is being used. The processor 70/80 is configured to check for this information. Should this information not have been transmitted to the tag 50 when the tag 50 was last read, then the process 1000 moves to its beginning.

It will be appreciated that steps 1010, 1020 and 1030 do not need to be performed in the order presented in FIG. 18 and can instead be performed in any different order.

It will also be appreciated that the process 1000 shown in FIG. 18 does not need to be performed continuously and, in one embodiment, the processor 70/80 switches to a hibernating/power saving state for a predetermined period of time. In this state, the only operation performed by the processor 70/80 is the monitoring of an internal timer to ensure that the processor 70/80 is re-activated to re-run the process 1000 after the predetermined period of hibernation has ended.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions which are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A system comprising:
a mobile reader configured to connect to a wirelessly readable memory device located on an aircraft cargo container, the memory device storing onward handling information for individual pieces of cargo inside the container, the mobile reader further configured to display the onward handling information.

2. The system of claim 1, wherein the mobile reader is configured to use a Bluetooth connection to connect to the wirelessly readable memory device.

3. The system of claim 1, wherein the mobile reader is configured to display updated onward handling information, and the updated onward handling information created by consolidating the onward handling information with up-to-date passenger destination information.

4. The system of claim 3, wherein the mobile reader is further configured to receive the up-to-date passenger destination information from a passenger control information system at an airport and to consolidate the information within the mobile reader.

5. The system of claim 3, wherein the reader is configured to read passenger destination information associated with an item of luggage representing one of the pieces of cargo inside the container from the wirelessly readable memory device of the container, to compare the passenger destination information with acquired up-to-date passenger destination information, and to change onward handling information for the piece of luggage based on a discrepancy found by the comparison.

6. The system of claim 3, wherein the system is further configured to receive an update on passenger destination information from an aircraft in flight.

7. The system of claim 3, wherein the mobile reader is configured to connect to a passenger control information system using WiFi.

8. The system of claim 1, further comprising:
a plurality of additional readers located at an airport, the additional readers configured to wirelessly detect the presence of the memory device and to update information indicating a most recent location of the container in a database upon the wireless detection.

9. The system of claim 1, further comprising:
a plurality of additional readers located at an airport, the additional readers configured to wirelessly detect the presence of the memory device, to read data stored in the memory device and to update information indicating a most recent location the container detailed in the data in a database upon the reading.

10. A method comprising:
wirelessly connecting with a mobile reader to a readable memory device located on an aircraft cargo container, the memory device storing onward handling information for individual pieces of cargo inside the container;
displaying the onward handling information on a display of the reader; and
directing the individual pieces of cargo onwards according to the onward handling information.

11. The method of claim 10, wherein wirelessly connecting with the mobile reader to the readable memory devices provided on the aircraft cargo container comprises:
using a Bluetooth connection to connect to the wirelessly readable memory devices.

12. The method of claim 10, further comprising:
acquiring, at the mobile reader, up-to-date passenger destination information;
consolidating the onward handling information with the up-to-date passenger destination information to create updated onward handling information; and
displaying the updated onward handling information.

13. The method of claim 12, further comprising:
receiving an update on passenger destination information from an aircraft in flight at a control system in an airport.

14. The method of claim 12, further comprising:
updating a control system within the airport to record a last known location for a container or for items of cargo within the container upon detection of the presence of a the memory device by one or more of a plurality of receivers located within the airport.

15. The method of claim 12, further comprising:
receiving the up-to-date passenger destination information at the mobile reader from a passenger control information system at the airport; and
consolidating the information within the mobile reader.

16. The method of claim 12, further comprising:
reading, using the mobile reader, passenger destination information associated with an item of luggage representing one of the pieces of cargo inside the container from the wirelessly readable memory device of the container;
comparing the read passenger destination information with acquired up-to-date passenger destination information; and
changing onward handling information for the piece of luggage based on a discrepancy found by the comparison.

17. The method of claim 12, further comprising:
receiving an update on passenger destination information from an aircraft in flight.

18. The method of claim 12, further comprising:
connecting the mobile reader to a passenger control information system using WiFi.

19. The method of claim 10, further comprising:
wirelessly detecting the presence of the memory device with a plurality of readers at an airport; and
updating information indicating a most recent location of the container in a database upon the wireless detection.

20. The method of claim 10, further comprising:
wirelessly detecting the presence of the memory device with a plurality of readers at an airport;
reading data stored in the memory device; and
updating information indicating a most recent location of items of cargo detailed in the data in a database upon the reading.

21. A computer program product comprising:
a non-transitory computer-readable medium; and
instructions stored on the non-transitory computer-readable medium that upon execution by one or more computer processors cause the one or more computer processors to:
wirelessly connect with a mobile reader to readable memory devices provided on aircraft cargo containers, the memory device storing onward handling information for individual pieces of cargo stored in the container;
display the onward handling information on a display of the reader; and
direct the individual pieces of cargo onwards according to the onward handling information.

* * * * *

UNITED STATES PATENT AND TRADEMARK OFFICE
CERTIFICATE OF CORRECTION

PATENT NO. : 10,289,882 B2
APPLICATION NO. : 15/190434
DATED : May 14, 2019
INVENTOR(S) : Matthew Coxall et al.

Page 1 of 1

It is certified that error appears in the above-identified patent and that said Letters Patent is hereby corrected as shown below:

In the Claims

At Column 24, Claim number 14, Line number 9, before "the" delete "a"

Signed and Sealed this
Twenty-fifth Day of June, 2019

Andrei Iancu
*Director of the United States Patent and Trademark Office*